United States Patent [19]
Knox

[11] Patent Number: 6,128,411
[45] Date of Patent: Oct. 3, 2000

[54] METHOD FOR EMBEDDING ONE OR MORE DIGITAL IMAGES WITHIN ANOTHER DIGITAL IMAGE

[75] Inventor: Keith T. Knox, Rochester, N.Y.

[73] Assignee: Xerox Corporation, Stamford, Conn.

[21] Appl. No.: 09/139,836

[22] Filed: Aug. 25, 1998

[51] Int. Cl.[7] .............................. G06K 9/46; G06K 9/00; G09C 3/00; B42D 15/00
[52] U.S. Cl. ........................... 382/232; 382/100; 380/54; 283/73
[58] Field of Search ..................................... 382/232, 100, 382/115, 284, 306; 380/54, 51, 55, 205; 283/17, 73, 72

[56] References Cited

U.S. PATENT DOCUMENTS

| | | | |
|---|---|---|---|
| 5,734,752 | 3/1998 | Kno ......................................... | 382/212 |
| 5,850,346 | 12/1998 | Barrus ....................................... | 380/51 |
| 5,859,920 | 1/1999 | Daly et al. ................................ | 382/115 |
| 5,875,249 | 2/1999 | Mintzer et al. .......................... | 380/54 |
| 5,970,140 | 10/1999 | Sandford, II et al. .................... | 380/54 |
| 6,005,643 | 12/1999 | Morimoto et al. ........................ | 348/409 |
| 6,005,936 | 12/1999 | Shimizu et al ........................... | 382/100 |
| 6,021,196 | 2/2000 | Sandford, II et al. .................... | 382/232 |
| 6,049,627 | 4/2000 | Becker et al. ............................. | 382/181 |

*Primary Examiner*—Thomas D. Lee
*Assistant Examiner*—Wenpeng Chen
*Attorney, Agent, or Firm*—Fay, Sharpe, Fagan, Minnich & McKee, LLP

[57] ABSTRACT

A method is described to combine together at least two continuous tone digital images into a combined digital image. When viewed in the standard manner, the combined image appears to be the first of the two images. The second image cannot be seen. When the bits within each pixel of the combined image are reversed, i.e. the least significant bit (LAB) is exchanged with the most significant bit (MB), and the resultant image is viewed, then the second image is seen. In this way, one image can be hidden inside the noise bits of another image. The method is applied to color images by treating each color separation independently. The encoding of one image into the other, while maintaining good image quality is accomplished using two simultaneous error diffusion calculations to determine the single output value for each pixel.

22 Claims, 4 Drawing Sheets

METHOD FOR EMBEDDING ONE OR MORE DIGITAL IMAGES WITHIN ANOTHER DIGITAL IMAGE

BACKGROUND OF THE INVENTION

The present invention relates to the digital imaging arts. It finds particular application in conjunction with embedding at least one digital image, such as a digital watermark or logo, within another digital image, and will be described with particular reference thereto. However, it should be appreciated that the present invention may also find application in conjunction with other types of digital imaging systems and applications where embedding hidden information in a digital image is desirable.

Given the finite bandwidth of most digital communication channels, it is desirable to incorporate as much information or data as possible into a digital image. Further, with private, corporate, and governmental interest in the information super-highway (i.e. Internet, World Wide Web, etc.) growing exponentially, there is a strong need to protect copyrighted materials that are embodied as digital images. In particular, there is a need to embed within a digital image, some indicia of ownership in order to secure for the owner the benefits afforded under the Copyright laws. Thus, regardless of how often a digital image is electronically copied or transferred, each digital copy should have embedded therein some indicia of ownership of the digital image.

Also, with the advent of image editing software, the ability to manipulate or otherwise alter a digital image on a pixel by pixel basis is readily available. Thus, there is a strong need to be able to authenticate a digital image in order to determine whether or not the digital image has in fact been altered in some way.

Accordingly, it has been considered desirable to develop a new and improved method for combining at least two separate digital images into a single combined digital image with minimum loss of image quality, which meets the above-stated needs and overcomes the foregoing difficulties and others while providing better and more advantageous results.

SUMMARY OF THE INVENTION

In accordance with one aspect of the present invention, a method of combining a first digital image and a second digital image into a combined digital image is disclosed. The method includes the steps of a) combining at least one bit of a first pixel associated with the first digital image with at least one second bit of a corresponding second pixel associated with the second digital image to form a corresponding output pixel of the combined digital image, b) distributing a difference value between the first pixel and the output pixel among a plurality of pixels located proximate the first pixel, c) reordering the bit order of the output pixel to form a reordered output pixel, d) distributing a difference value between the second pixel and the reordered output pixel among a plurality of pixels located proximate the second pixel, and e) repeating steps a)–d) for each of the pixels of the first digital image.

In accordance with another aspect of the present invention, a method of embedding at least a first digital image within a second digital image is disclosed. The method includes the steps of a) replacing at least one lower order bit of a second digital image pixel with at least one higher order bit of a corresponding first digital image pixel, b) determining a difference value between the second digital image pixel prior to performing step a) and the second image pixel after performing step a), and diffusing the difference value among a plurality of other second digital image pixels, c) reordering the bit order of the second digital image pixel, d) determining a difference value between the first digital image pixel and the reordered second digital image pixel, and diffusing the difference value among a plurality of other first digital image pixels, and e) repeating steps a)–d) for each of the pixels of the first digital image.

In accordance with yet another aspect of the present invention, a method of authenticating a digital image displayed on a video monitor is disclosed, the digital image including authenticating indicia embedded therein. The method including the steps of a) reordering the bits of each pixel defining the digital image, and b) displaying the digital image to view the authenticating indicia, the digital image being authentic when the authenticating indicia is not altered and the digital image not being authentic when the authenticating indicia has been altered.

One advantage of the present invention is the provision of a method for combining at least two digital images into a single digital image without increasing the size (i.e. storage requirements) of the combined digital image beyond that of the larger of the two digital images, and without degrading image quality.

Another advantage of the present invention is the provision of a method for hiding extra information (such as a digital watermark to establish ownership of the image, instructions that might be read for later processing, or authenticating indicia, etc.) in a digital image.

Yet another advantage of the present invention is the provision of a method for increasing the throughput across a data channel.

A still further advantage of the present invention is the provision of a method for authenticating a digital image.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
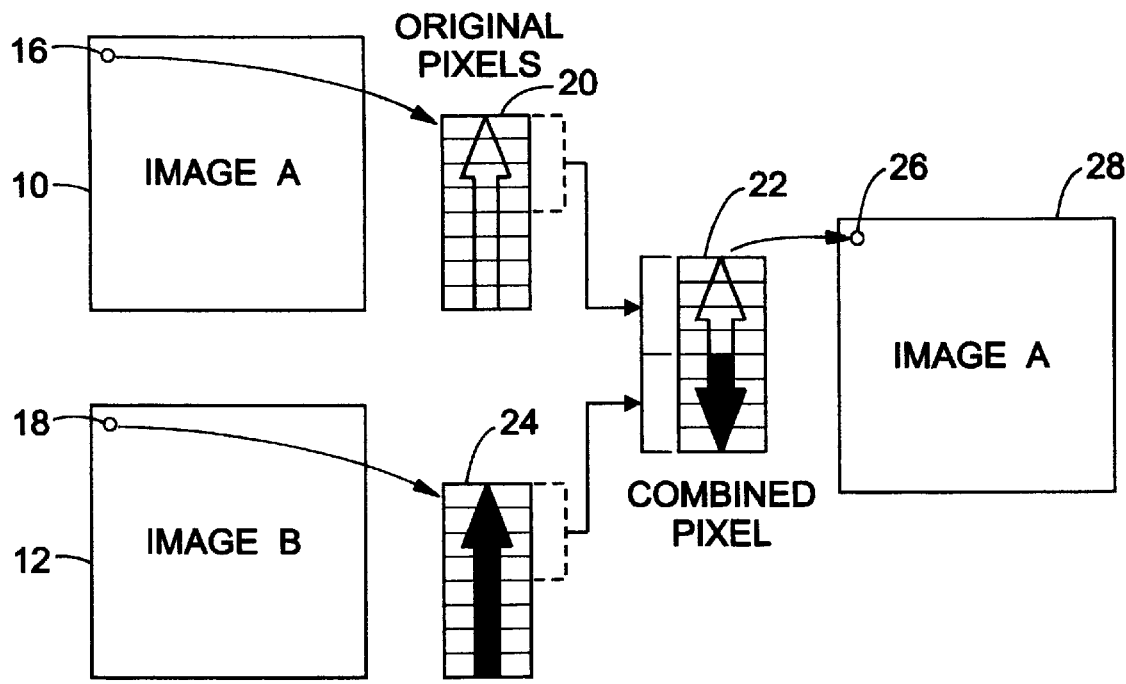
FIG. 1 illustrates how to assemble and manipulate picture elements of a combined digital image in order to view a first digital image that is embedded within the combined image.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image bearing the original for the duration of image data is well known and does not form a part of the present invention.

Image data may also be derived by a computer workstation program in accordance with document creation application software or from a data storage device. In content, the original video image signals may be composed entirely of a single image component such as lines, text, low frequency halftones, high frequency halftones, contones, or any combination thereof.

Moreover, in describing the present invention, it is assumed that the video signal has a value in a range between 0 and 255. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor.

The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed image or the physical spot created by the smallest rendered ink droplet.

Figure 2:
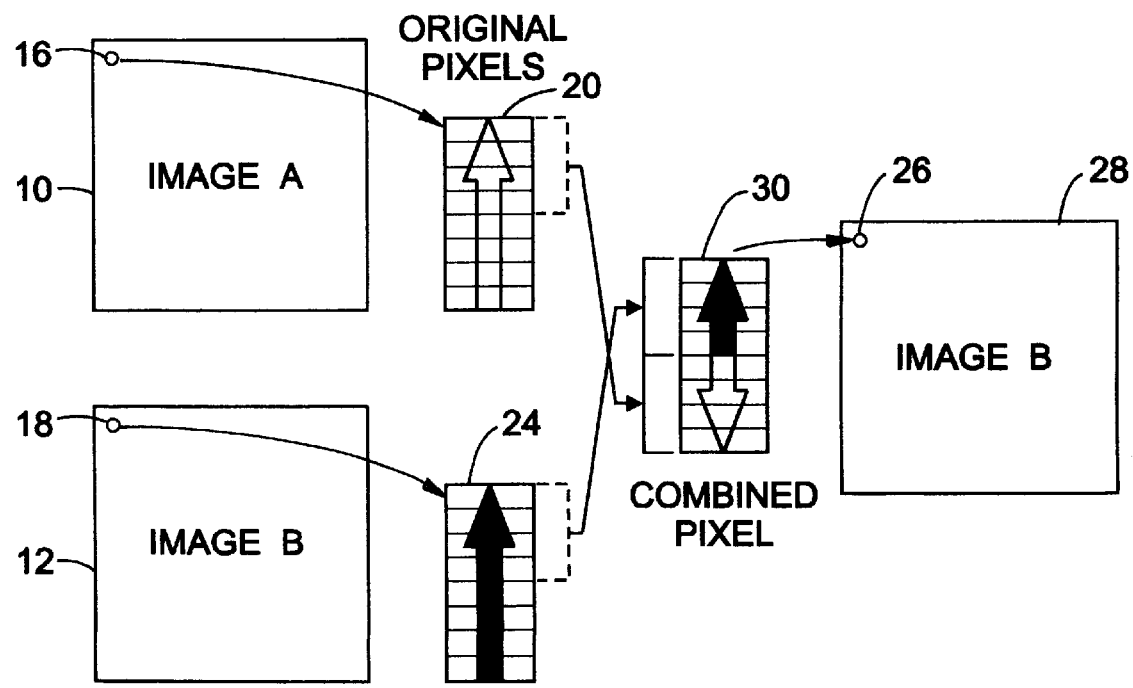
FIG. 2 illustrates how to manipulate the combined digital image of FIG. 1 in order to view a second digital image embedded with the combined image.

With reference to FIGS. 1 and 2, a first continuous-tone digital image A is stored in a first image buffer or register 10 and a second continuous-tone digital image B is stored in a second image buffer or register 12. The digital images A, B are conventionally stored as 2-dimensional arrays of binary numbers in the image buffers 10, 12. The stored binary numbers can correspond to different information such as gray scale intensity, luminance, chrominance, etc. The images A, B can be sampled and digitized using a scanner, digital camera, frame grabber, or other digitizing device and then stored on a storage medium such as RAM, ROM, hard drive, magnetic tape, floppy disk, CD, DVD, etc.

The digital images A, B can be represented with any number of bits per picture element (i.e. pixel). Typically, gray scale images are represented as 1 byte(8 bits)/pixel. This allows each pixel to span the range from 0 (black) to 255 (white). The bits defining each pixel element are ordered from the most significant bit $B_7$ to the least significant bit $B_0$ (assuming an 8 bit pixel) where the more significant bits typically represent captured image information and the less significant bits essentially represent random noise. The term "the upper order bits" hereafter refers to one or more of the bits forming the upper or most significant half of a pixel, while the term "the lower order bits" hereafter refers to one or more of the bits forming the lower or least significant half of a pixel. For example, the upper order bits of an 8-bit pixel are the $B_7$ to $B_4$ bits, while the lower order bits on an 8-bit pixel are the $B_3$ to $B_0$ bits.

Further, gray scale images can be stored as bitmapped or rasterized image files having many picture elements or pixels. For example, a 512×512 image would have 262,144 picture elements. True color images can be represented as 3 bytes(24 bits)/pixel where each byte represents the grey scale intensity of one color component (red, green, blue) of the color image. Color maps or look-up tables can be used to represent the color images with 1 or 2 bytes per pixel.

Figure 3A:
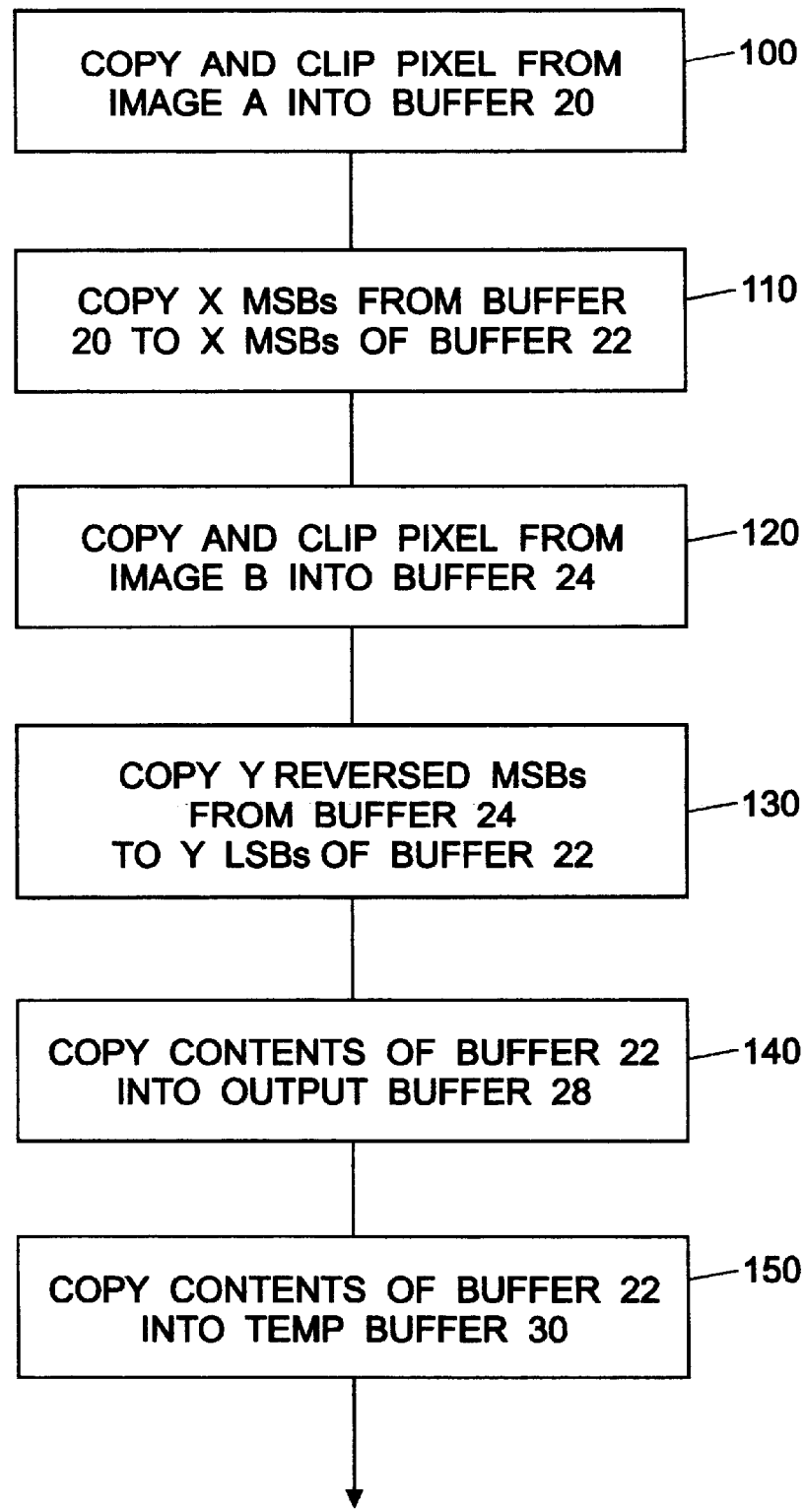
FIGS. 3a and 3b illustrate a flow chart for combining the first and second digital images into the combined digital image of FIG. 1.
Figure 3B:
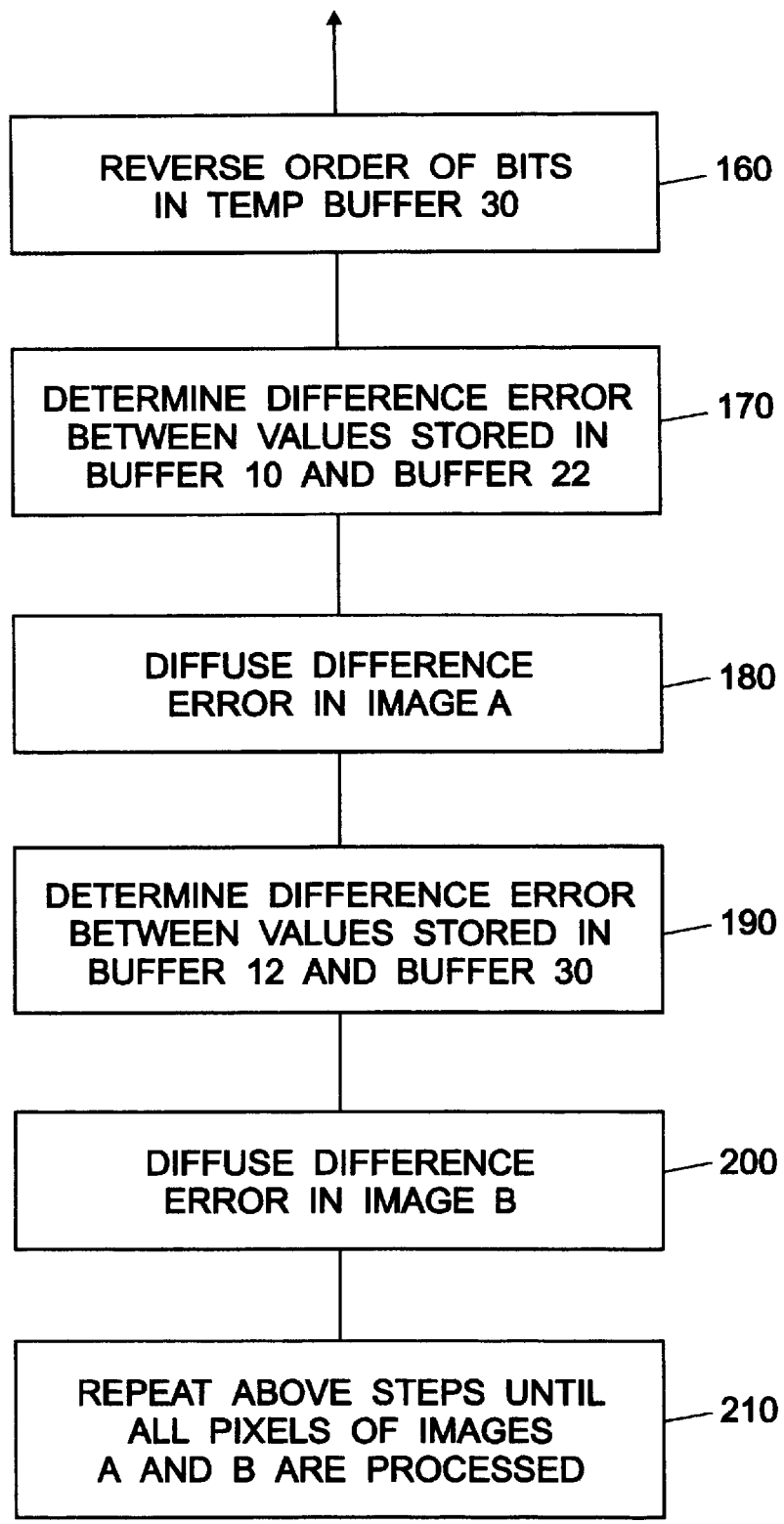

With both digital images stored as described above, the images can then be combined into a single digital output image by parsing both digital input images A, B on a pixel-by-pixel basis starting with the upper left pixel 16, 18 of each digital image. In particular, as shown in the flowchart of FIGS. 3a and 3b, the data representing the intensity of the upper left pixel 16 of image A is clipped to the range 0 to 255 (as described further below), reduced to a single byte, and stored in an input pixel buffer 20 (Block 100). The four most significant bits (MSBS) of data ($B_7$–$B_4$) in the buffer 20 are then copied into the four most significant bits of an output pixel buffer 22 in the same bit order (Block 110). That is bit $B_7$ in the buffer 20 becomes bit $B_7$ in the buffer 22, and bit $B_4$ in the buffer 20 becomes bit $B_4$ in the buffer 22.

Likewise, the data representing the intensity of the upper left pixel 18 of image B is clipped to the range 0 to 255, reduced to a single byte, and stored in an input pixel buffer 24 (Block 120). The four most significant bits of data ($B_7$–$B_4$) from the buffer 24 are then copied into the four least significant bits of the output pixel buffer 22 in reverse bit order (Block 130). That is bit $B_7$ in the buffer 24 becomes bit $B_0$ in the buffer 22, and bit $B_4$ in the buffer 24 becomes bit $B_3$ in the buffer 22. In effect, the 4-bit pixel intensity information for image B is hidden within the noise bits of the pixel intensity information for image A.

Thus, the four most significant bits (MSBs) from each pixel 16, 18 are copied from each image and combined to form an 8-bit output pixel 26 where the four most significant bits from the pixel 16 form the four most significant bits of the output pixel 26 and the four most significant bits of the pixel 18 are reversed in order and form the four least significant bits of the output pixel 26. The combined output pixel 26 is then copied into an output image buffer 28 (Block 140). The combined output pixel 26 is also copied (Block 150) and stored in a bit-reversed order (Block 160) in a temporary buffer 30 (FIG. 2) for subsequent processing as described below.

By creating the output pixel 26, an error has been made. That is, the value of the output pixel 26 is not equal to the value of the input pixel 16, nor equal to the value of the input pixel 18. Thus, a standard multilevel error diffusion process is then performed. That is, the difference between the intensity value of the output pixel 26, stored in buffer 22, and the intensity value of the "unclipped" input pixel 16, stored in buffer 10, is determined (Block 170). The resulting difference value is then distributed to the pixels neighboring and/or adjoining pixel 16 in image A (Block 180).

Figure 4A:
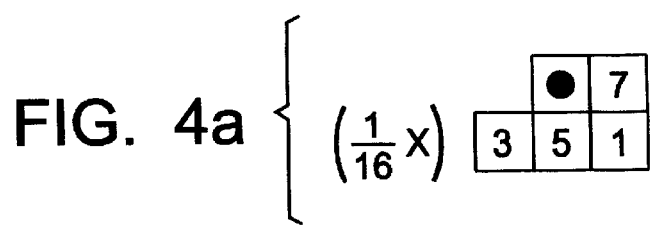
FIGS. 4a–4c illustrate exemplary error filters for performing a dual error diffusion process as part of combining the first and second digital images into the combined digital image of FIG. 1.
Figure 4B:
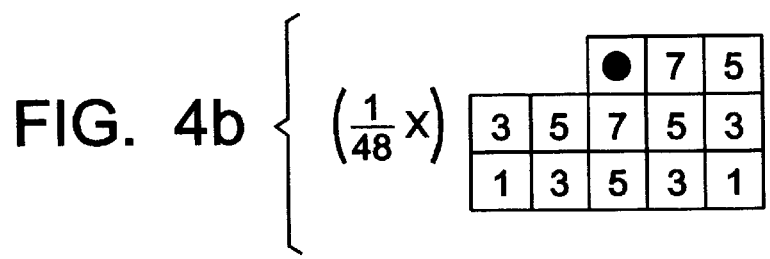
Figure 4C:
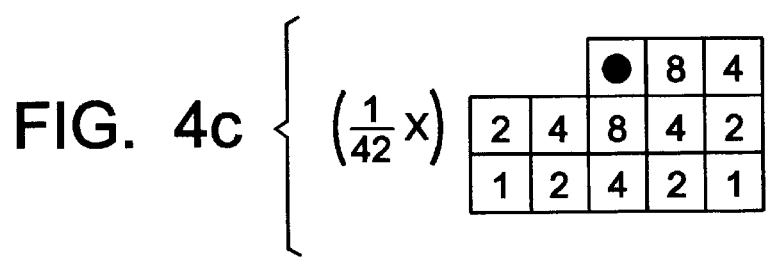

FIG. 4 shows a number of conventional error filters that can be used to distribute the difference value between the input and output pixels 16, 26. In particular, FIG. 4a shows a Floyd and Steinberg error filter which divides the difference value into sixteenths and weights the difference distribution among four adjoining image A pixels as shown. FIG. 4b shows a Jarvis, Judice, and Ninke error filter which divides the difference value into forty-eighths and weights the difference distribution among twelve adjoining and neighboring image A pixels as shown. FIG. 4c shows a Stucki error filter which divides the difference value into forty-seconds and weights the difference distribution among twelve adjoining and neighboring image A pixels as shown. The modified image pixels are subsequently used to produce the combined output image in the same manner as described with the first pixel 16.

In addition to diffusing difference values among adjoining and neighboring pixels with the above-described error diffusion algorithm, other error diffusion algorithms can be used, including those known to enhance edges. An exemplary method of enhancing the edges of an image is described and claimed in commonly-assigned U.S. Pat. No. 5,045,952, issued to Reiner Eschbach for "Method for Edge Enhanced Error Diffusion" on Sep. 3, 1991.

It should be appreciated that when the weighted difference errors are distributed in Block 180, the values of the adjoining/neighboring pixels may increase above the upper limit value of 255, or decrease below the lower limit value of 0. In both cases, more than a single byte (8 bits) is required to store the combined input pixel and distributed error. It is contemplated that the distributed errors can be stored in a secondary data buffer (not shown)for subsequent use when the pixel is eventually processed, or the data buffer 10 can simply be provided with the capacity to store more than a single byte (8 bits) of data for each image pixel.

When a pixel having a value above 255 is subsequently processed, the pixel value is first clipped or otherwise set to 255 prior to being copied into the input pixel buffer 20 (Block 100). Likewise, when a pixel having a value below 0 is processed, the pixel is first clipped or otherwise set to 0 when the pixel is copied into buffer 20 (Block 100).

A standard multilevel error diffusion process is also performed for image B based on the difference value between the "unclipped" input pixel 18 stored in buffer 12 and the bit-reversed output pixel 26 stored in buffer 30. That is, the difference between the intensity value of the bit reversed output pixel 26, stored in buffer 30, and the intensity value of the input pixel 18, stored in buffer 12, is determined (Block 190). The resulting difference value is then distributed to the pixels neighboring and/or adjoining pixel 18 in the second image B (Block 200) using a known error diffusion routine. As with the image A pixels, difference errors generated as a result of the error diffusion process are stored in either a secondary data buffer or included with the input pixels in data buffer 12. Further, the image B pixels, when they are stored in image buffer 24, are clipped to 0 or 255 (Block 120) if the values thereof fall outside the range of 0 to 255 as a result of the previous error diffusions (Block 200).

Figure 5:
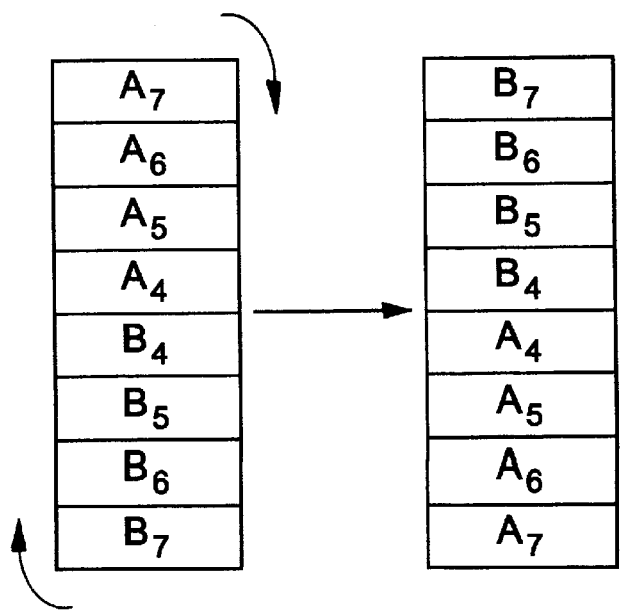
FIG. 5 illustrates how the bit order of each picture element of the combined digital image of FIG. 1 is reversed to view the first or the second embedded digital image.

The two error diffusion calculations are run simultaneously over both input images A, B and the combined output image as both input images are parsed in a pixelwise, left to right and top to bottom pattern (Block 210). The end result is a combined output image, stored in buffer 28, that looks like the first image A when viewed (i.e. displayed on a video monitor) directly (FIG. 1), and looks like the second image B when each of the pixels forming the combined output image are reordered, such as bit-reversed, as shown in FIG. 5 and viewed (FIG. 2). It is contemplated that a simple utility program could be used to bitwise reverse each of the combined image pixels in the output buffer 28 prior to viewing the images A, B.

If the input images A, B are color images, each color separation is treated individually in the same manner described above. That is, the red color separations from images A and B can be combined to produce a red output color separation; the blue color separations from the images A and B can be combined to produce a blue output color separation; and the green color separations from the images A and B can be combined to produce a green output color separation. It is also contemplated that different color separations can be combined. For instance, the red color separation of the first image can be combined with the green color separation of the second image, etc.

The combined output image can be electronically copied and transferred without destroying the hidden image embedded therein. Thus, electronic copies of the combined image can be bitwise reversed or otherwise manipulated on a pixel by pixel basis to view, for example, ownership or copyright information (such as a digital watermark or logo) of the combined image, user instructions, or any other visual or textual information that can be contemplated.

One important application of the above described process is image authentication wherein the original digital image (i.e. image A) includes an authentication mark or pattern (i.e. image B) embedded therein in the manner described above. In the event that a user alters the digital image, such as with image editing software (Paint Shop Pro by JASC, Photo Shop by Adobe, etc.), the embedded authentication mark would also be altered indicating that the original image is not authentic and has in fact been tampered with.

For example, assume that an original digital image of a person (i.e. image A) is embedded with an authentication mark or pattern (i.e. image B) in the manner described above. Image editing software can then be used to alter the original image by, for example, electronically cropping out the person's body and electronically inserting another person's body in its place. The pixels representing the second person's body do not have the higher order authentication mark pixel bits embedded therein. Thus, when a utility program is used to bitwise reorder the pixels of the digital image, the result is an altered authentication mark indicting that the original image is no longer authentic.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, the method of embedding at least one hidden digital image within another digital image of the present invention can be implemented in hardware, software, firmware, or any combination thereof. Further, any number of hardware buffers or software buffers may be used to accomplish the method of embedding at least one hidden digital image within another digital image of the present invention.

Additional methods for combining the first and second input pixels 16, 18 into the output pixel 26 are contemplated. For instance, rather than reversing the order of the four most significant bits of the second image, the upper four bits of each image can be placed into the upper and lower four bit locations of the output pixel without reversing the order of the bits placed in the lower 4 bits of the combined image. To see the hidden image, the upper and lower 4 bits of the combined image are simply swapped and the result is viewed. The error diffusion methods are run in the same manner as before, except that now the combined image is made without reversing the bit order.

Further, it is contemplated that the output pixel 26 can be comprised of unequal numbers of bits from the input pixels 16, 18. Thus, X does not have to equal Y in steps 100–130 of FIGS. 3*a* and 3*b*; the hidden image B can be a single-bit image or it can have fewer than the described four bits. For example, the combined pixel can include six bits $B_7$–$B_2$ from pixel 16 and only two bits $B_1$–$B_0$ from pixel 18.

It is also contemplated that the combined output image can incorporate more than one hidden image. For example, four single-bit images can be hidden in the lower four bits of the combined output image. Thus, a simple utility program can be used to manipulate the bit order of each pixel to view the different images embedded in the combined digital image.

Having thus described the preferred embodiment(s), the invention is now claimed to be:

1. A method of combining a first digital image and a second digital image into a combined digital image, the method comprising the steps of:
   a) combining at least one bit of a first pixel associated with the first digital image with at least one second bit of a corresponding second pixel associated with the second digital image to form a corresponding output pixel of the combined digital image;
   b) distributing a difference value between the first pixel and the output pixel among a plurality of pixels located proximate the first pixel;
   c) reordering the bit order of the output pixel to form a reordered output pixel;
   d) distributing a difference value between the second pixel and the reordered output pixel among a plurality of pixels located proximate the second pixel; and
   e) repeating steps a)–d) for each of the pixels of the first digital image.

2. The method of claim 1, wherein step a) includes the step of:
   f) combining at least the most significant data bit of the first pixel with at least the most significant data bit of the second pixel to form the output pixel.

3. The method of claim 1, wherein the higher order bits of the first pixel form the higher order bits of the output pixel and the higher order bits of the second pixel form the lower order bits of the output pixel.

4. The method of claim 1, wherein the four most significant bits of the first pixel form the four most significant bits of the output pixel and the four most significant bits of the second pixel form the four least significant bits of the output pixel.

5. The method of claim 1, wherein step a) includes the steps of:
   f) combining a plurality of bits of the first pixel with a plurality of second bits of the second pixel to form the corresponding output pixel; and
   g) reordering the bit order of the plurality of second bits prior to step f).

6. The method of claim 5, wherein step g) includes the step of:
   h) reversing the bit order of the plurality of second bits.

7. The method of claim 1, wherein step c) includes the step of:
   f) reversing the bit order of the output pixel to form the reordered output pixel.

8. The method of claim 1, wherein step c) includes the step of:
   f) swapping the upper order bits of the output pixel with the lower order bits of the output pixel to form the reordered output pixel.

9. The method of claim 1, further including the steps of:
   f) after step e) displaying the combined digital image to view the first digital image;
   g) reordering the bit order of each output pixel of the combined digital image; and
   h) displaying the combined digital image to view the second digital image.

10. The method of claim 9, wherein step g) includes the step of:
    i) reversing the bit order of each output pixel of the combined digital image.

11. The method of claim 9, wherein step g) includes the step of:
    h) swapping the upper order bits with the lower order bits of each output pixel of the combined digital image.

12. The method of claim 1, further including the step of:
    f) repeating steps a) to e) for each color separation of the first and second digital images.

13. The method of claim 1, further including the step of:
    f) prior to step a), limiting the values of the first and second pixels to within a predetermined range of values.

14. The method of claim 13, wherein step f) includes the step of:
    g) limiting the value of the first and second pixels to a range of $0_{10}$ to $255_{10}$.

15. The method of claim 1, wherein one of the first and second digital images includes at least one of ownership indicia and authentication indicia.

16. A method of embedding at least a first digital image within a second digital image, the method comprising the steps of:
    a) replacing at least one lower order bit of a second digital image pixel with at least one higher order bit of a corresponding first digital image pixel;
    b) determining a first difference value between the second digital image pixel prior to performing step a) and the second digital image pixel after performing step a), and diffusing the first difference value among a plurality of other second digital image pixels;
    c) reordering the bit order of the second digital image pixel;
    d) determining a second difference value between the first digital image pixel and the reordered second digital image pixel, and diffusing the second difference value among a plurality of other first digital image pixels; and e) repeating steps a)–d) for each of the pixels of the second digital image.

17. The method of claim 16, wherein step a) includes the step of:

f) replacing the lower order bits of the second digital image pixel with the upper order bits of the first digital image pixel.

18. The method of claim 17, further including the step of:

g) prior to step f), reordering the bit order of the upper order bits of the first digital image pixel.

19. The method of claim 16, further including the steps of:

f) after step e), reordering the bit order of each pixel of the second digital image to view the first digital image embedded within the second digital image.

20. The method of claim 16, wherein the first digital image includes at least one of ownership indicia and authentication indicia.

21. The method of claim 16, further including the step of:

f) prior to step a), limiting the value of the first digital image pixel and the value of the second digital image pixel to within a predetermined range of values.

22. A method of authenticating a digital image displayed on a video monitor, the digital image including authenticating indicia embedded therein, the method comprising the steps of:

a) reordering the bits of each pixel defining the digital image to form a reordered digital image; and b) displaying the reordered digital image to view the authenticating indicia, the digital image being authentic when the authenticating indica is not altered and the digital image not being authentic when the authenticating indicia has been altered.

* * * * *